United States Patent [19]

Klueting

[11] Patent Number: 4,641,887

[45] Date of Patent: Feb. 10, 1987

[54] PLANETARY SEAT BACK ADJUSTER

[75] Inventor: Bernd A. Klueting, Jung-Stilling-Weg, Fed. Rep. of Germany

[73] Assignee: Keiper Recaro Incorporated, Battle Creek, Mich.

[21] Appl. No.: 776,659

[22] Filed: Sep. 16, 1985

[51] Int. Cl.⁴ .............................................. A47C 1/025
[52] U.S. Cl. ...................................... 297/362; 74/801
[58] Field of Search .......... 297/362; 74/788, 801–803; 16/354

[56] References Cited

U.S. PATENT DOCUMENTS

| | | | |
|---|---|---|---|
| 2,591,967 | 4/1951 | Ridgely et al. ........................ | 74/801 |
| 3,165,947 | 1/1965 | Smith ................................. | 74/788 X |
| 3,203,275 | 8/1965 | Hoover .............................. | 74/801 X |
| 3,764,162 | 10/1973 | Rawlings ........................... | 74/801 X |
| 4,133,344 | 1/1979 | Hunter et al. ..................... | 74/801 X |
| 4,211,451 | 7/1980 | Shephard ........................... | 74/801 X |

FOREIGN PATENT DOCUMENTS 1094608  12/1960  Fed. Rep. of Germany ...... 297/362

Primary Examiner—Kenneth J. Dorner
Assistant Examiner—Peter Brown
Attorney, Agent, or Firm—Lloyd M. Forster

[57] ABSTRACT

An adjustable seat back hinge mechanism actuated by planetary gearing with means to provide an input/output reduction ratio within a range in the order of 30:1 to 50:1 from manual hand knob actuation or in the order of 120:1 for electric motor drive.

4 Claims, 8 Drawing Figures

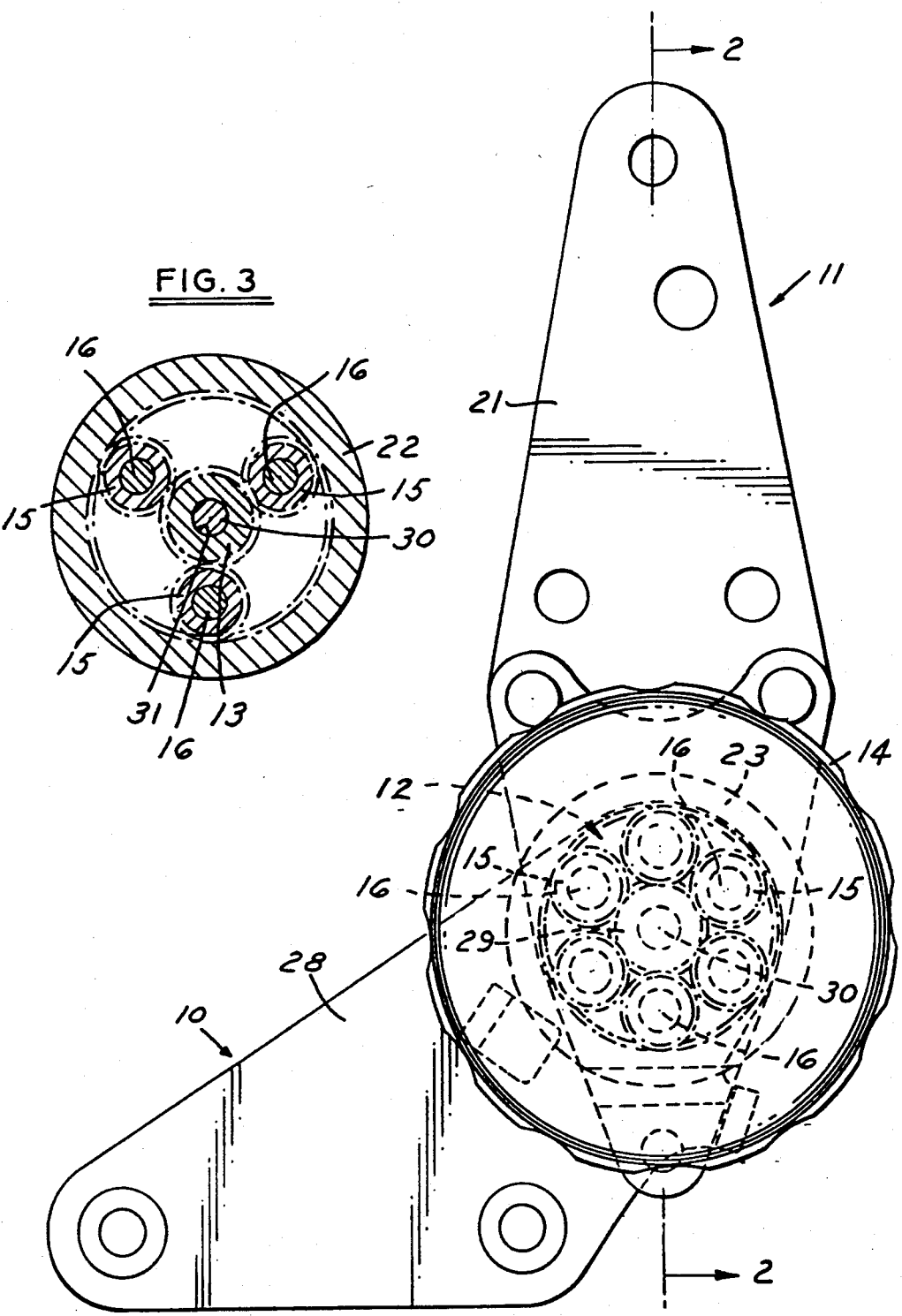

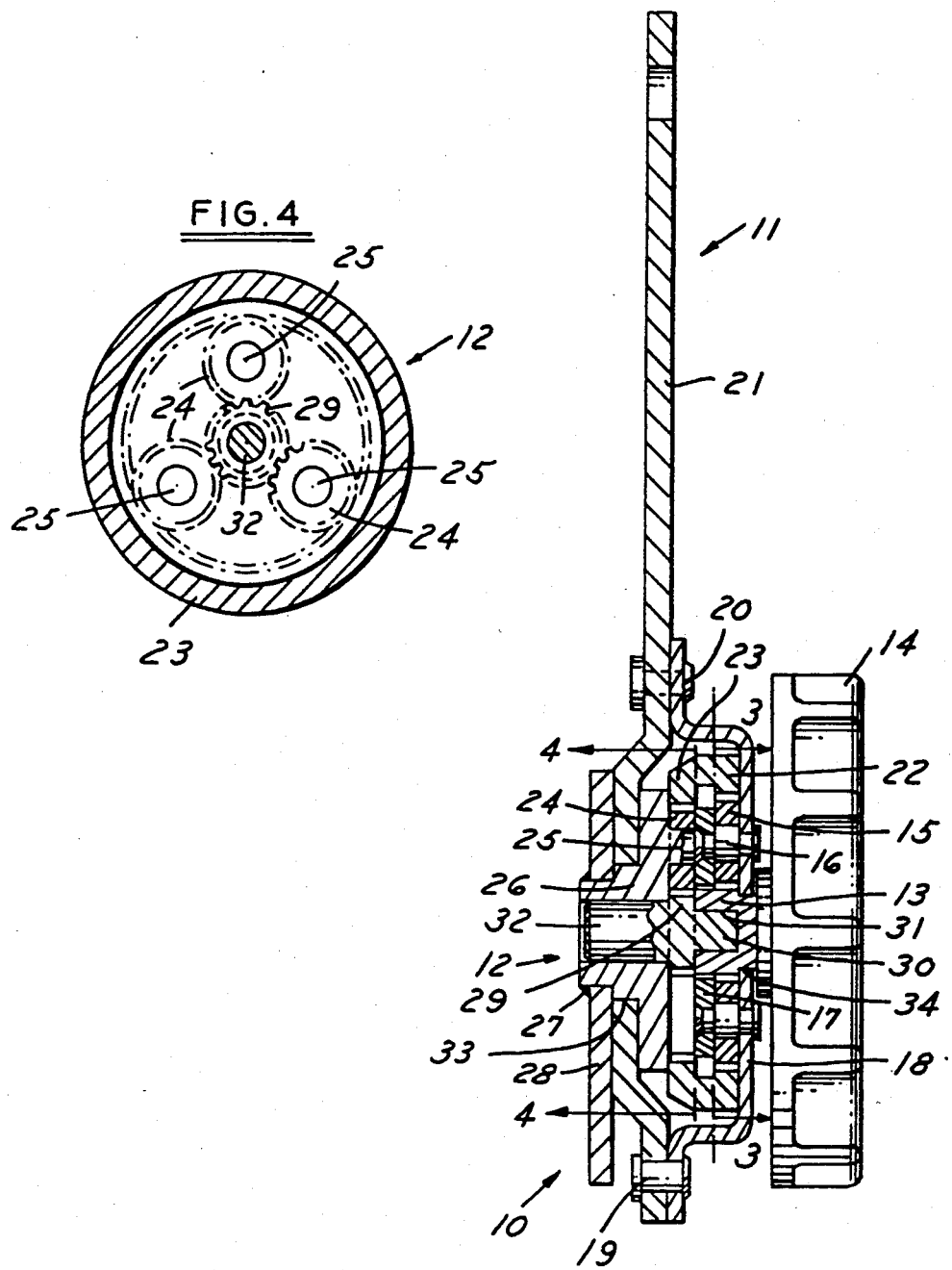

PLANETARY SEAT BACK ADJUSTER

BACKGROUND OF THE INVENTION

Seat reclining mechanisms employing planetary gear drives for achieving reduction appropriate to hand knob actuation are known in the prior art, that closest to the present invention being shown in U.S. Pat. No. 4,211,451 which discloses an internally toothed ring gear in each of the two hinge plates for respective mounting on a seat and a back rest. One ring gear has more teeth than the other and the respective ring gears are engaged by common planetary gears which are in turn driven by a sun gear to provide a relative differential drive due to the different number of teeth in the ring gears.

Additional prior art of record in applicant's prior related application includes the following:

| Patent No. | Date | Name | Class | Sub-Class |
| --- | --- | --- | --- | --- |
| 2,591,967 | 4/1951 | Ridgely etal | 74 | 801 |
| 3,165,947 | 1/1965 | Smith | 74 | 788 |
| 3,203,275 | 8/1965 | Hoover | 74 | 801 |
| 3,764,162 | 10/1973 | Rawlings | 74 | 801 |
| 4,211,451 | 7/1980 | Shephard | 74 | 801 |
| 4,345,792 | 8/1982 | Shephard | 16 | 354 |
| 1,094,608 | 12/1960 | Reutter (Germany) | 297 | 362 |

SUMMARY OF THE PRESENT INVENTION

The present invention employs a compound set of two planetary gear systems each including sun, planet and ring gear elements wherein the respective ring gears having a different number of teeth are integrally connected. Two sun gears having a different number of teeth are likewise integrally connected and the respective planetary carriers are connected to the seat and seat back hinge members. In this manner with both sun gears connected for common input drive and both ring gears connected for common backward rotation relative to sun gear input the differential number of teeth in respective sun and ring gears provide a differential reduction drive between the respective bracket members which may be in a range in the order of 30:1 to 50:1.

In a modification adapted for electric motor input requiring 120:1 reduction, an electric motor driven worm engages a worm gear providing an initial reduction in the order of 30:1 with the output of the worm gear driving the sun of a planetary gear set having a fixed ring and a carrier output to a pinion which drives a segment connected to the seat back bracket.

BRIEF DESCRIPTION OF THE DRAWINGS

FIG. 1 is a side elevation of a seat back hinge adjusted by a hand knob through the planetary gear system of the present invention;

FIG. 2 is a sectional view taken along the line 2—2 of FIG. 1;

FIG. 3 is a sectional view taken along the line 3—3 of FIG. 2;

FIG. 4 is a sectional view taken along the line 4—4 of FIG. 2;

DETAILED DESCRIPTION OF THE PREFERRED EMBODIMENTS

Figure 5:
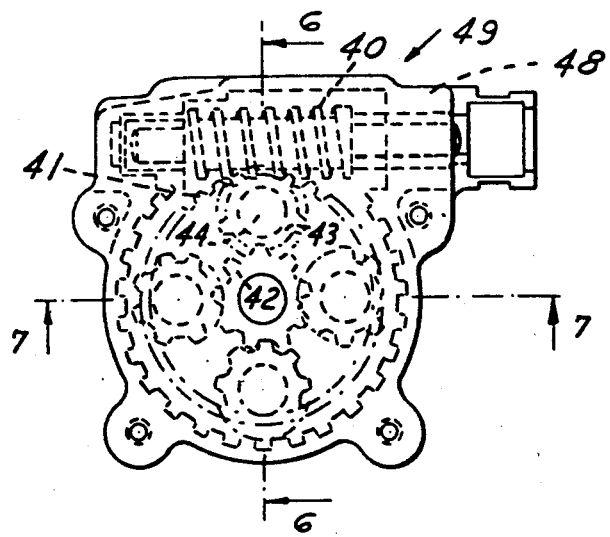
FIG. 5 is a side elevation of a modified electric motor driven planetary set.

With reference to FIG. 1 the seat back adjuster of the present invention includes lower bracket 10 for seat attachment, upper bracket 11 for seat back attachment, and a pivotal connection therebetween provided by a planetary gear reduction transmission system generally indicated at 12.

With reference to FIG. 2, input sun gear 13 driven by hand knob 14 drives three planet gears 15 rotatable on rivets 16 secured to a carrier formed by inner plate 17 and backing plate 18 which is riveted at 19 and 20 to upper hinge plate 21. Planet gears 15 drivingly engage ring gear 22 integrally connected to ring gear 23 which engages three planet gears 24 mounted on stub extensions 25 of carrier 26 welded at 27 to plate 28 of lower seat bracket 10. Planet gears 24 also engage sun gear 29 drivingly connected to sun gear 13 through a square drive extension 30 engaging square pocket 31 formed within sun gear 13. Cylindrical extension 32 of sun gear 29 provides a pivotal bearing for carrier 26 which is turn provides pivotal bearing 33 for upper bracket plate 21. Cylindrical projection 34 of sun gear 13 in turn provides a pivotal bearing for backing plate 18 whereby all elements of the planetary gear system are suitably held in operating alignment.

As a typical example, sun gear 13 may be provided with eleven teeth, planet gears 15 with nine teeth, and ring gear 22 with twenty-nine teeth, sun gear 29 with nine teeth, planet gears 24 with nine teeth and ring gear 23 with twenty-seven teeth providing an overall reduction ratio of 29:1.

A higher reduction ratio may be provided with a smaller differential in the number of teeth in the respective gear sets; for example, by modifying one of the planetary sets to employ an input sun gear 13 with ten teeth and ring gear 22 with twenty-eight teeth, a reduction ratio of 56:1 would result.

Figure 6:
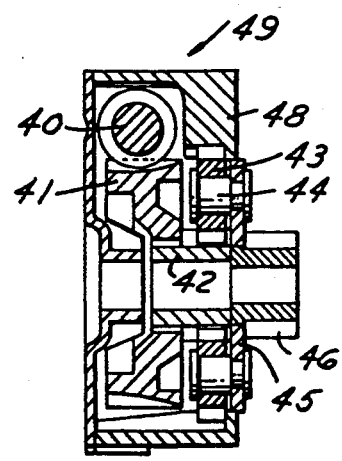
FIG. 6 is a sectional view taken along the line 6—6 of FIG. 5.
Figure 7:
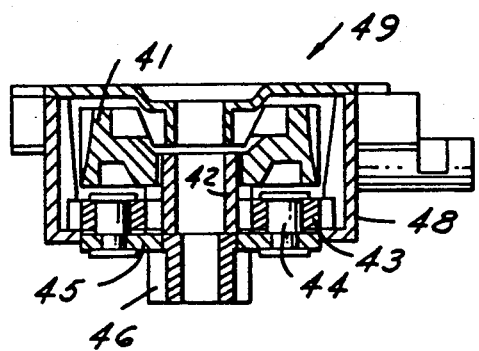
FIG. 7 is a sectional view taken along the line 7—7 of FIG. 5.
Figure 8:
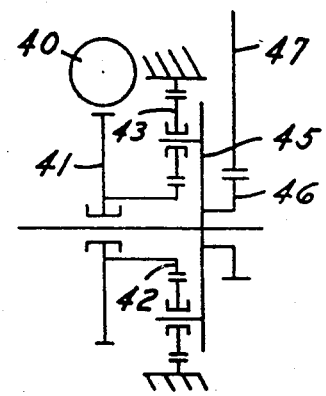
FIG. 8 is a schematic view of the transmission elements involved in the FIG. 5 embodiment.

With reference to FIGS. 5 to 8 electric motor driven worm 40 engaging worm wheel 41 having thirty teeth provides a 30:1 reduction drive to sun gear 42 engaging planet gears 43 rotatable on rivets 44 secured to output carrier 45 and pinion 46 engaging segment 47 which may be secured to a seat back bracket element such as 11 in FIG. 1, planet gears 43 also engaging fixed reaction ring gear 48 secured to housing 49. In this transmission the 30:1 reduction ratio for worm gear 41 is multiplied by the reduction ratio of the planetary gearing which in the case of equal sun and planets as shown would be 4:1 providing an overall ratio of 120:1 to the pinion 46.

The planetary gear set in this case is offset from the pivotal axis of the segment 47 and upper hinge bracket driven thereby and an additional reduction ratio may be provided based on the ratio of the radius of pinion 46 to the radius of segment 47.

I claim:

1. Seat back adjuster comprising pivotally connected seat and seat back hinge members, planetary gear means for adjusting the relative position of said hinge members, said means including a simple planetary speed reduction gear output set comprising sun input, planetary gear carrier output, and fixed ring gear elements, and speed reduction motor driven worm and worm wheel input means drivingly connected with the sun of said output set to provide a multiplied compound overall reduction ratio.

2. The seat back adjuster of claim 1 including a pinion driven by said carrier output.

3. The seat back adjuster of claim 2 including a gear segment driven by said pinion adapted for connection to a seat back hinge member.

4. The seat back adjuster of claim 3 wherein said worm and worm wheel provide means for producing a reduction drive in the order of 30 to 1 and said planetary gear set in the order of 4 to 1 to establish an overall reduction in the order of 120 to 1.

* * * * *